April 19, 1932.  D. JOHANSEN  1,854,902
ROD WEEDER
Filed July 8, 1931   2 Sheets-Sheet 2
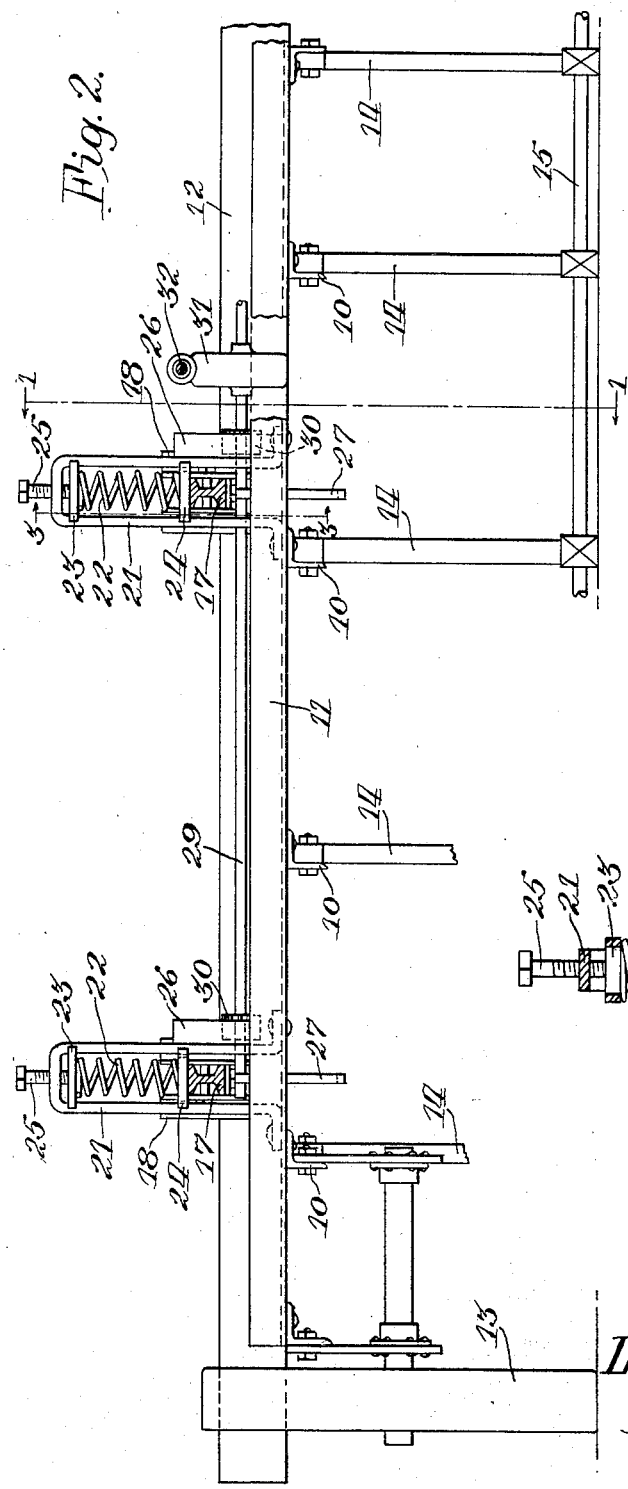
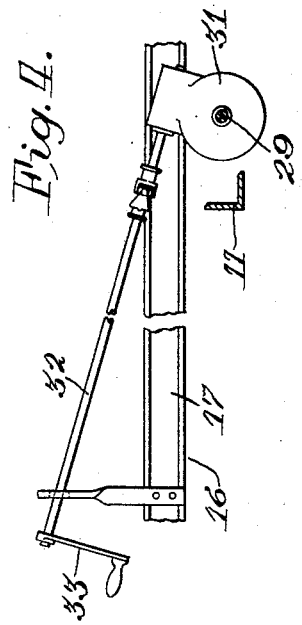
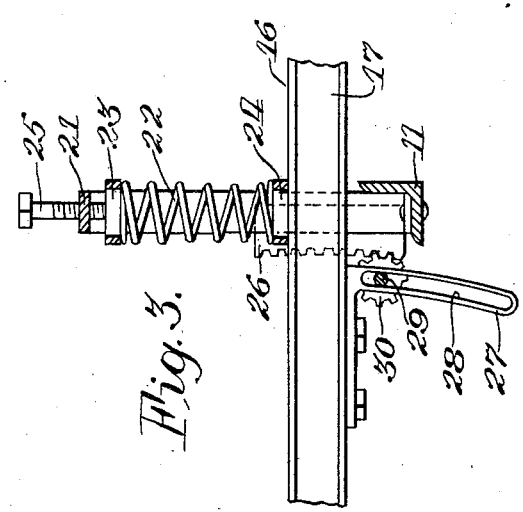
Inventor
Donald Johansen Patented Apr. 19, 1932

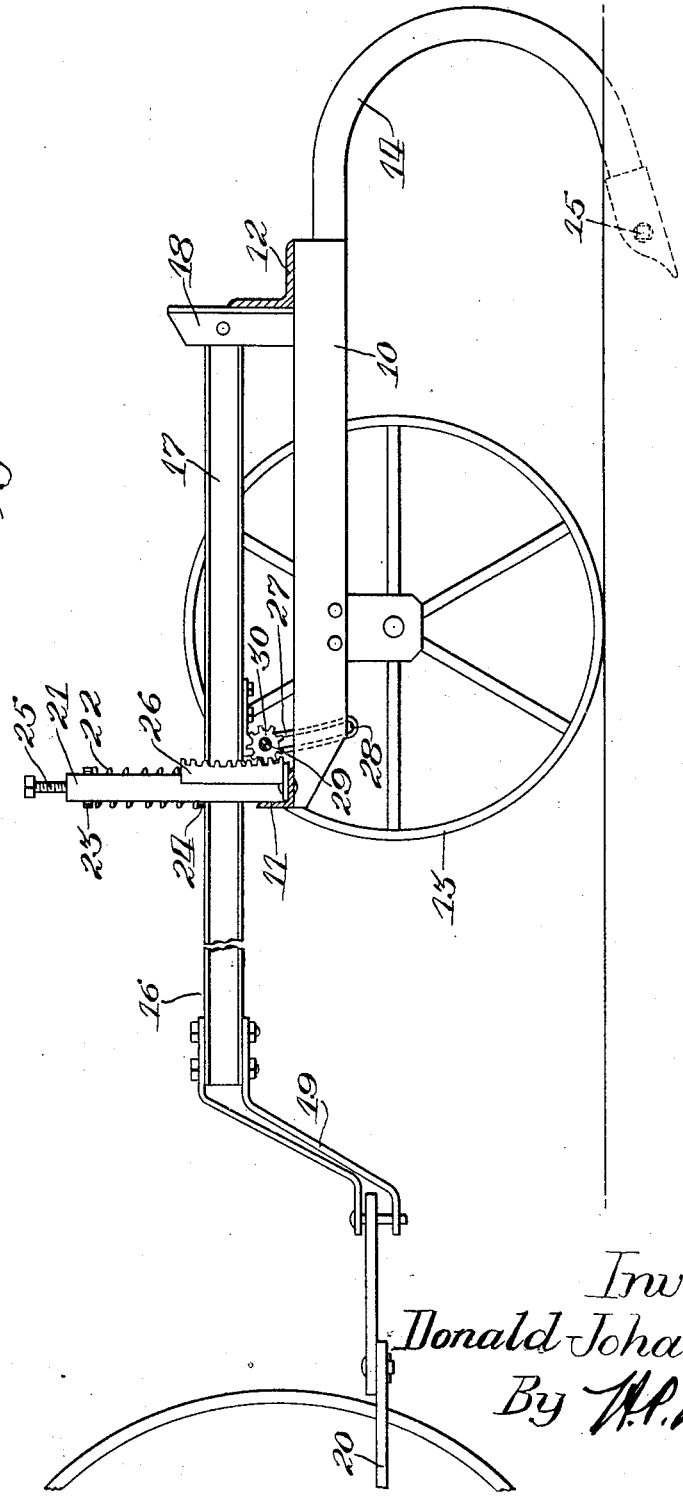

1,854,902

UNITED STATES PATENT OFFICE

DONALD JOHANSEN, OF WEYBURN, SASKATCHEWAN, CANADA, ASSIGNOR TO INTERNATIONAL HARVESTER COMPANY OF CANADA, LIMITED, OF HAMILTON, ONTARIO, CANADA, A CORPORATION OF ONTARIO, CANADA

ROD WEEDER

Application filed July 8, 1931. Serial No. 549,420.

This invention relates to improvements in the type of cultivating implements known as rotary rod weeders.

The main object of the invention is to embody in the structure of such machines some means for preventing breakage or injury to the machine when the rotary rod encounters an obstacle such as a stone in the soil.

Another object is to provide means for vertically adjusting the rod carrying frame to vary the depth of operation of the rod in the soil, or to lift it out of the soil for transport, so constructed as to permit automatic vertical movement of the rod carrying frame when the rod strikes an obstacle.

The foregoing and other minor objects and advantages are obtained by the construction and arrangement of parts hereinafter more particularly described and claimed, and illustrated in the accompanying drawings, where:

Figure 1 is a longitudinal sectional side view of a rod weeder embodying the invention, seen on line 1—1, Figure 2;

Figure 2 is a front view with parts in section;

Figure 3 is a detailed sectional view on the line 3—3, Figure 2; and

Figure 4 is a detailed view of part of the adjusting mechanism.

In the present instance the invention is illustrated as embodied in a rod weeder having the general construction and organization of the tractor rod weeder shown in the U. S. Patent to Robinson, No. 1,801,979, April 28, 1931. Such a machine consists of a laterally extended oblong rectangular main frame 10, preferably constructed with a front angle iron bar 11 and a similar rear bar 12. This frame is supported on end wheels 13, the axis of which is located between the front and rear sides of the frame 10, and preferably somewhat forward of the central transverse line thereof. The frame 10 has secured thereto a plurality of rearwardly and downwardly curved standards 14, in the lower ends of which the rotary rod 15 is journaled. This rod may be driven in the usual way from one of the wheels 13. The main frame 10 is connected to a draft frame 16, which is disposed in overlapping relation to the main frame 10, preferably above the same as shown. The draft frame includes horizontally extending bars 17 which are pivotally connected at their rear ends to upright bracket members 18 secured to the rear portion of the frame 10. The forward ends of the bars 17 are connected to a central downwardly extending pair of draft bars 19, which are provided with suitable means for pivotal connection to the draw bar of a tractor, indicated at 20. This provides a construction in which the frame 10 is rockable on the axis of the wheels 13 as it moves about the pivot of the bars 17 on the brackets 18, to elevate and depress the rotary rod.

In order to provide for adjustment of the main frame 10 and the rod carried thereby and for automatic movement of the rod and frame to ride over obstacles, the front side of the frame 10 is provided with upright yoke members 21, which straddle the draft frame bars 17, as shown in Figure 2. The yoke members 21 are preferably formed of flat metal bars bent into an inverted U shape having laterally extended foot portions secured to the front angle bar 11 of the frame. Each yoke member 21 encloses a coil spring 22, which is confined between thrust plates 23 and 24, formed with lateral ears slidably engaging the edges of the yoke 21. The lower thrust plate 24 bears on the bar 17 and the upper thrust plate 23 bears against the lower end of an adjusting screw 25 threaded into the upper or bight portion of the yoke member. Adjustment of the screw 25 will serve to vary the pressure of the spring 22 as desired. With the construction so far described it will be understood that should the rod 15 strike a rock or similar obstacle, the frame 10 will be rocked on the wheels as the rear end of the frame rises, with a corresponding depression of the forward side of the frame and consequent compression of the springs 22. This will allow the rod to ride over the obstacle, after which the thrust of the springs will automatically return the frame and rod to the original operating position.

In order to provide for adjustment, and lifting and lowering of the rod carrying frame without interference with the automatic yielding action above described, the yoke members 21 (Fig. 3) are each provided at one side with an upright arcuate rack piece 26, rigidly secured thereto and movable with the yoke and the frame 10. Adjacent each rack 26 each bar 17 has secured thereto a depending bearing bracket 27, formed with an elongated arcuate slot 28, Figure 3. The slots 28 are bearings for a transversely extending adjusting shaft 29, on which there is secured pinions 30 meshing with the rack pieces 26. The shaft 29 is provided with means for manually turning it, which preferably consists of a housing 31 enclosing a worm wheel secured on the shaft and a worm pinion enmeshing therewith and secured to a forwardly extending operating shaft 32, having a crank hand 33 located in proximity to the operator's station on the tractor. Preferably the operating shaft 32 is provided with a universal joint 33, to facilitate movement of the adjusting shaft with relation to the operating shaft 32. With the adjusting mechanism just described it will be seen that the adjusting shaft 29 will normally be held in position in the upper end of the slot 28 as it, in effect, forms a stop to the upward movement of the forward side of frame 10. Rotation of this shaft by crank 33 will cause the pinions 30 to raise or lower the racks 26 and consequently the front end of the frame 10, thereby elevating or depressing the rear portion of this frame and the rotary rod. The worm drive normally locks it against rotation. Should the rod strike an obstacle, causing the rear portion of the frame to be swung upwardly, the shaft 29 will be free to move downwardly in the slots 28 as the forward portion swings down and as the springs are compressed during rocking movement of the frame 10 the parts will automatically return to their initial positions when the obstacle has been passed.

There has accordingly been provided a simple and efficient structure for permitting yielding movement of the rod carrying frame, while also retaining the provision for adjusting the rod carrying frame as desired. The construction illustrated and described represents a preferred embodiment of the invention which may, however, be modified within the scope of the following claims.

What is claimed is:

1. In a rod weeder, a horizontally disposed main frame rockably supported on axially aligned end wheels located between its front and rear sides, a ground engaging rotary rod carried by said frame and positioned back of the axis of said wheels, a draft frame overlapping said main frame and pivotally connected thereto on a transverse axis back of the axis of said wheels, and a vertically yieldable connection between the forward portion of the main frame and the draft frame.

2. In a rod weeder, a horizontally disposed main frame rockably supported on axially aligned end wheels located between its front and rear sides, a ground engaging rotary rod carried by said frame and positioned back of said wheels, a draft frame comprising horizontal bars pivotally connected to the main frame on a transverse axis back of the axis of said wheels and extending forwardly beyond the main frame, spring connections between the bars and the main frame located forward of the pivotal connections of said bars to the main frame and yieldable to allow rocking movement of the main frame when the rod strikes an obstruction, and means for angularly adjusting the main frame on its pivotal connection to the draft frame.

3. In a rod weeder, a horizontally disposed main frame rockably supported on axially aligned end wheels located between its front and rear sides, a ground engaging rotary rod carried by said frame and positioned back of said wheels, a draft frame extending forward of the main frame comprising horizontal bars located above the main frame and pivoted thereto on a transverse axis back of the axis of said wheels, upright guide members on the forward portion of the main frame extending above said horizontal bars, coil springs confined between the upper ends of said guide members and said bars, means for adjusting the tension of said springs, and means for angularly adjusting the main frame on its pivotal connection to the draft frame.

4. In a rod weeder, a horizontally disposed main frame rockably supported on axially aligned end wheels located between its front and rear sides, a ground engaging rotary rod carried by said frame and positioned back of said wheels, a draft frame extending forward of the main frame comprising horizontal bars located above the main frame and pivoted thereto on a transverse axis back of the axis of said wheels, upright yoke members embracing said horizontal bars, coil springs within said yoke members and bearing on said bars, and means for angularly adjusting the main frame on its pivotal connection to the draft frame comprising racks on the main frame, slotted bearing brackets on the horizontal bars, a shaft journaled in the slots in said brackets and provided with pinions engaging the racks, and means for rotating the shaft.

5. In a rod weeder, a horizontally disposed main frame rockably supported on axially aligned end wheels located between its front and rear sides, a ground engaging rotary rod carried by said frame and positioned back of said wheels, a draft frame extending forward of the main frame comprising horizontal bars located above the main frame and pivoted thereto on a transverse axis back of the axis of said wheels, upright guide members on the forward portion of the main frame extending above said horizontal bars, coil springs connecting said guide members and said bars, and means for angularly adjusting the main frame on its pivotal connection to the draft frame comprising rack and pinion connections between the draft frame and the main frame.

In testimony whereof I affix my signature.

DONALD JOHANSEN.